United States Patent [19]

Maruca

[11] Patent Number: 4,986,020
[45] Date of Patent: Jan. 22, 1991

[54] FISHING FLY FLOATING AGENT AND PREPARATION THEREOF

[76] Inventor: Paul Maruca, P.O. Box 132, Errol, N.H. 03579

[21] Appl. No.: 509,194

[22] Filed: Apr. 16, 1990

[51] Int. Cl.$^5$ ............................................. A01K 69/00
[52] U.S. Cl. ........................................................ 43/4
[58] Field of Search ........................... 43/4, 42.06, 4.5; 524/463, 464, 588

[56] References Cited

U.S. PATENT DOCUMENTS

| | | | |
|---|---|---|---|
| 2,662,029 | 12/1953 | Mathes | 524/588 |
| 4,098,742 | 7/1978 | Mueller | 524/588 |
| 4,245,420 | 1/1981 | Carr | 43/42.06 |
| 4,530,179 | 7/1985 | Larew | 43/42.06 |
| 4,540,632 | 9/1985 | Finn | 524/463 |
| 4,703,077 | 10/1987 | Webb | 524/463 |
| 4,771,564 | 9/1988 | Whitley | 43/4 |
| 4,901,466 | 2/1990 | Davis | 43/4 |

Primary Examiner—Richard K. Seidel
Assistant Examiner—Chuck Y. Mah
Attorney, Agent, or Firm—Thomas N. Neiman

[57] ABSTRACT

It has long been the practice to treat fishing flies with various solutions to enable them to float or to manufacture them in such a manner in order to have them float. A compound containing 1,1,1-trichloroethane and silicone in a waxed preparation form are mixed for use as an agent to keep the flies dry and enable them to float when the fishing fly is dipped into said solution. A method of treating the fishing fly is also disclosed.

1 Claim, No Drawings

FISHING FLY FLOATING AGENT AND PREPARATION THEREOF

This invention pertains to floating agents, and in particular to such floating agents for use in keeping fishing flies dry in order to allow them to float on the surface of the water when in use.

The most common approaches that currently exist in the fly fishing areas is to use materials in the construction of fishing flies that allow them to float or to treat flies with chemicals so that they do not become waterlogged and sink. A large number of chemicals have been used with variable results. These chemicals tend to very difficult to properly handle and don't tend to have a great deal of longevity that would allow the treated fishing fly to float for an extended period of time. What is needed is a floating agent that is economical to use. Additionally, what is needed is a floating agent that is effective and is not harmful to the user or to the environment when used as directed.

Clearly, it is desirable for a floating agent that does not contain the limitations described above and at the same time is simple and practical to operate. It is the object of this invention, then to set forth an improved floating agent device which avoids the disadvantages limitations, above-recited, which obtain in current floating agents.

It is also the object of this invention to teach a floating agent which is simple to use. It is another object of this invention to teach a floating agent that is safe and effective for the user of the product and, at the same time, is safe for the environment when used as directed. Particularly, it is the object of this invention to set forth a floating agent, for use in protecting fishing flies from moisture to enable them to float on the surface of the water, comprising a mixture of 1,1,1-trichloroethane and silicone in a wax base; an approximate proportion of eight parts 1,1,1-trichloroethane; and an approximate proportion of one part silicone in a wax base.

It is another object of this invention to teach a method of treating fishing flies and the like to enable them to float on the surface of the water, comprising the steps of placing one ounce of liquid 1,1,1-trichloroethane in a container; adding an eighth of an ounce of silicone in a wax base into said container; mixing the above-identified mixture in said container until said silicone is dissolved; dipping the fishing fly to be treated into said mixture; allowing said mixture to be in contact with said fishing fly for a period of time; withdrawing said fishing fly form said container; and allowing said fishing fly to dry to the touch.

Further objects and features of this invention will become more apparent by reference to the following description. The following example represents the preferred embodiment of the invention. The parts and percentage figures are expressed on a weight basis throughout the specification. The floating agent was prepared as follows:

|  | Percent by weight |
| --- | --- |
| 1,1,1-trichloroethane | 87.5 |
| waxed silicone | 12.5 |

1,1,1-trichloroethane is a nonflammable liquid that is insoluble in water and has a molecular weight of 133.42. It absorbs water and has been used for cleaning cold metals and plastic molds. Silicone is a semiorganic polymer with a quartz like structure. The user would place one ounce of the 1,1,1-trichloroethane in a small glass vial or like vessel.

One eighth of an ounce of a waxed silicone is added to the mixture. The silicone has the consistency of a paste wax material. The user stirs the mixture until the silicone has dissolved and then dips the item being treated into the mixture. After a short period of time the fishing fly is withdrawn from the mixture and allowed to dry. It is then ready to use and will remain on the surface of the water as is desired for an extended period of time.

While I have described my invention in connection with specific embodiments thereof, it is clearly to be understood that this is done only by way of example and not as a limitation to the scope of my invention as set forth in the objects thereof and in the appended claims.

I claim:

1. A method of treating fishing flies and the like to enable them to float on the surface of water, comprising the steps of:

placing one ounce of liquid 1,1,1-trichloroethane in a container;

adding an eighth of an ounce of silicone in a wax base into said container;

mixing the above-identified mixture in said container until said silicone is dissolved;

dipping the fishing fly to be treated into said mixture;

allowing said mixture to be in contact with said fishing fly for a period of time;

withdrawing said fishing fly from said container; and allowing said fishing fly to dry to the touch.

* * * * *